United States Patent
Tafazoli et al.

(10) Patent No.: US 6,816,773 B2
(45) Date of Patent: Nov. 9, 2004

(54) DEVICE AND A METHOD FOR CONTROLLING THE FUEL-AIR RATIO

(75) Inventors: Maria Tafazoli, Sävedalen (SE); Hans Bernler, Göteborg (SE); Bengt Jalnäs, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/604,674

(22) Filed: Aug. 8, 2003

(65) Prior Publication Data

US 2004/0148086 A1 Jul. 29, 2004

Related U.S. Application Data

(63) Continuation of application No. PCT/SE02/00208, filed on Feb. 6, 2002, now abandoned.

(30) Foreign Application Priority Data

Feb. 9, 2001 (SE) .............................................. 0100429

(51) Int. Cl.$^7$ ......................... F02D 19/02; F02D 41/14
(52) U.S. Cl. ....................... 701/103; 123/478; 123/527
(58) Field of Search ................................ 701/103, 105; 123/527, 478, 683, 585, 699, 700

(56) References Cited

U.S. PATENT DOCUMENTS

| 5,413,075 A | * | 5/1995 | Mamiya et al. ............. 123/527 |
| 5,529,048 A | | 6/1996 | Kurihara et al. ............ 123/478 |
| 5,598,825 A | | 2/1997 | Neumann .................... 123/685 |
| 5,615,655 A | * | 4/1997 | Shimizu ...................... 123/527 |
| 5,946,905 A | | 9/1999 | Bouwman .................... 60/274 |
| 6,041,765 A | | 3/2000 | O'Neill et al. .............. 123/683 |

FOREIGN PATENT DOCUMENTS

| EP | 0812980 A2 | 12/1997 |
| WO | WO 9814696 A1 | 4/1998 |

* cited by examiner

Primary Examiner—Hieu T. Vo
(74) Attorney, Agent, or Firm—Novak Druce LLP

(57) ABSTRACT

Method and apparatus for controlling the ration of the amount of fuel and the amount of air in a natural gas fueled internal-combustion engine intended to work in a specified engine-specific load-rotation speed diagram. The apparatus includes a throttle for controlling the amount of air supplied to the combustion chamber in the internal-combustion engine, injection devices for controlling the amount of natural gas supplied to the combustion chamber and control devices for controlling the throttle and the injection devices, whereby the control devices are arranged to control the ratio of the amount of fuel and the amount of air dependent on the current operating point in the internal-combustion engine's load-rotation speed diagram.

14 Claims, 5 Drawing Sheets

DEVICE AND A METHOD FOR CONTROLLING THE FUEL-AIR RATIO

CROSS REFERENCE TO RELATED APPLICATIONS

This application is a continuation patent application of International Application No. PCT/SE02/00208 filed 6 Feb. 2002 now abandoned, which was published in English pursuant to Article 21(2) of the Patent Cooperation Treaty, and which claims priority to Swedish Application No. 0100429-0 filed 9 Feb. 2001. Both applications are expressly incorporated herein by reference in their entireties.

BACKGROUND OF INVENTION

1. Technical Field

The present invention relates to an apparatus for regulating the ratio of the amount of fuel and the amount of air in a natural gas powered internal-combustion engine intended to work in a specified engine-specific load-rotation speed diagram. The apparatus further includes: a throttle for controlling the amount of air supplied to combustion chambers in the internal-combustion engine, injection devices for controlling the amount of natural gas supplied to the combustion chambers, and control devices for controlling the throttle and the injection devices. The control device is arranged to control the ratio of the amount of fuel and the amount of air dependent on the current operating point in the internal-combustion engine load-rotation speed diagram. The invention also relates to a method of regulating the ratio of the amounts of fuel and air in a natural gas powered internal-combustion engine utilizing such an apparatus.

2. Background

Natural gas engines are mainly used as alternatives to diesel engines because natural gas engines are lower in emissions than are diesel engines. In particular, particle production during combustion of the fuel in a diesel engine is a problem, and for which reason there have been attempts to reduce particle emissions using particle traps downstream of such diesel engines. This development direction, however, is associated with technical, as well as economic problems. Therefore, natural gas engines can be used as alternatives to diesel engines.

Today's natural gas fueled internal-combustion engines designed for powering heavy vehicles are modified diesel engines. Internal-combustion engines are designed so that a maximum allowed operation temperature is not exceeded. If this temperature is exceeded, the thermal load may lead to engine breakdown. Such a breakdown can take place in the engine's main components. An example would be that the pistons of an internal-combustion engine can become welded to the walls of the combustion chamber of an engine if temperatures are allowed to go too high. Alternatively, a breakdown can take place in the exhaust pipes of the vehicle downstream of the combustion chambers where, for instance, turbochargers can be subjected to thermal overload. To avoid these problems, present natural gas fueled internal-combustion engines are run with a fuel-air ratio of $\lambda=1.5$.

This operation has shown itself to have the disadvantage that a catalyzer/catalyst/catalytic converter located downstream of the internal-combustion engine becomes poisoned because of the occurrence of sulphur in the fuel and engine oil.

During operation of heavy vehicles it is important that their response at low engine speeds be good, by which it is meant that available torque at and near idle-speed is large. It has been shown, however, that natural gas fueled vehicles in lean operation have relatively low torque at idle speed compared to the available torque at the operating point or speed of the engine that produces maximum power.

SUMMARY OF INVENTION

An objective of the invention is to provide a method and apparatus for controlling the ratio between the amount of fuel and the amount of air in a natural gas fueled internal-combustion engine where the operation of the internal-combustion engine allows regeneration of a catalyzer/catalyst located downstream of the internal-combustion engine. An associated objective is to provide an apparatus and a method for regulating the ratio of the amount of fuel and the amount of air in a natural gas fueled internal-combustion engine which allows an increase in the available torque at idle speed.

By dividing the internal-combustion engine's load-rotation speed diagram into a first area where the internal-combustion engine is operated leanly and a second area where the internal-combustion engine is operated stochiometrically so that the area of stochiometric operation is arranged to be used at operation points in the load-rotation speed diagram with low load and/or low rotation rate, an internal-combustion engine is achieved for which the available torque at idle speed is substantially increased and for which regeneration of the catalyzer is possible through intermittent operation in uniform operation; that is, operation at the stochiometric ratio.

The same advantages are achieved when the internal-combustion engine is operated stochiometrically at operation points in the internal-combustion engine's load-rotation rate diagram with low power and such that the internal-combustion engine operates leanly at operation points in the load-rotation rate diagram with high power.

According to a preferred embodiment of the invention, the specified operating point map of the engine for $\lambda$ value control in the vehicle's load-rotation speed diagram is so arranged that the boarder line between lean operation and stochiometric operation is placed so that the temperature downstream of the internal-combustion engine's combustion chamber exhaust ports is limited to a maximum allowed temperature. This temperature limit usually amounts to about 700° C.

In a further preferred embodiment of the invention, the existing operating point in the internal-combustion engine's load-rotation speed diagram is determined by using a parameter that is independent of which operational state the internal-combustion engine is in for the moment, such as the parameter required torque. By using a control parameter that is not affected by the internal-combustion engine's momentary operational state, stable operation and simple control algorithms are obtained compared to when a dependent parameter such as load, rotation rate or developed torque is used.

In a further preferred embodiment, there is a step-by-step change in the $\lambda$ value at the transition from lean operation to stochiometric operation and at the transition from stochiometric operation to lean operation. In an especially preferred embodiment this stepwise change takes place in the form of a linear ramp. Through this procedure, the risk of abrupt changes occurring in the developed torque on changing operation areas with internal-combustion engines is reduced.

In yet another preferred embodiment of the invention, the first and second areas partly overlap each other whereby unstable changes between the first area and the second area are suppressed.

BRIEF DESCRIPTION OF DRAWINGS

An embodiment of the invention will be described below with reference to the attached drawings, wherein.

DETAILED DESCRIPTION

Figure 1:
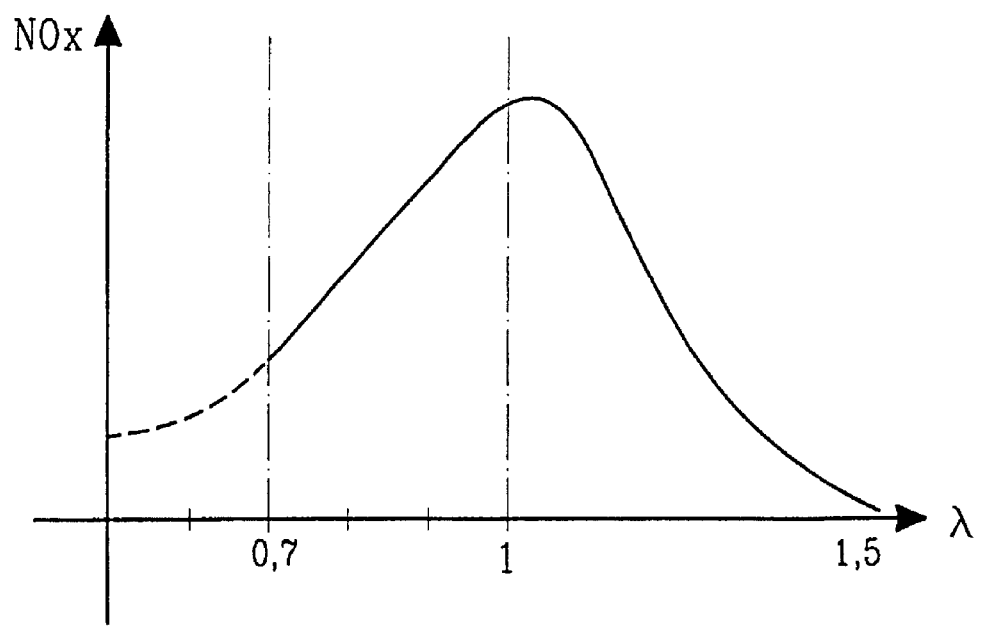
FIG. 1 graphically illustrates the formation of NOx as a function of $\lambda$ for a natural gas engine.

In FIG. 1, a graph-based diagram of the production of NOx as a function of the fuel to air ratio, $\lambda$, for combustion of natural gas in an internal-combustion engine is shown. This diagram shows that NOx production has a maximum at a $\lambda$ value just over 1. Thereafter, NOx production decreases rapidly with increasing $\lambda$ and is very low at $\lambda > 1.5$. Commonly, measurements on NOx formation at $\lambda = 1$ are 10 g/kWh and at $\lambda = 1.5$ about 1.5 g/kWh.

Figure 2:
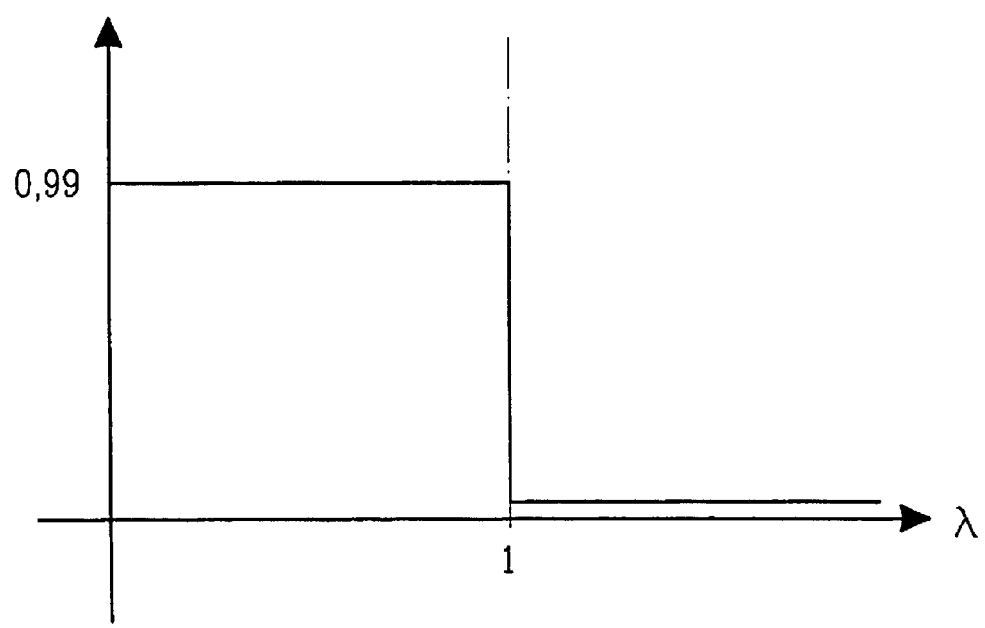
FIG. 2 graphically illustrates the degree of conversion, as a function of $\lambda$ for an oxidation catalyzer mounted downstream of a natural gas fueled internal-combustion engine.

In FIG. 2 the degree of conversion of NOx as a function of $\lambda$ for an oxidation catalyzer mounted downstream of a natural gas fueled internal-combustion engine is graphically shown. The degree of conversion is on the order of 99% for $\lambda$ less than 1.0, and negligible for $\lambda$ exceeding 1.0.

Against the background of the conditions shown in FIGS. 1 and 2, conventional natural gas engines have been designed either for operation in lean mode with $\lambda > 1.5$ or in uniform operation with $\lambda = 1$.

Figure 3:
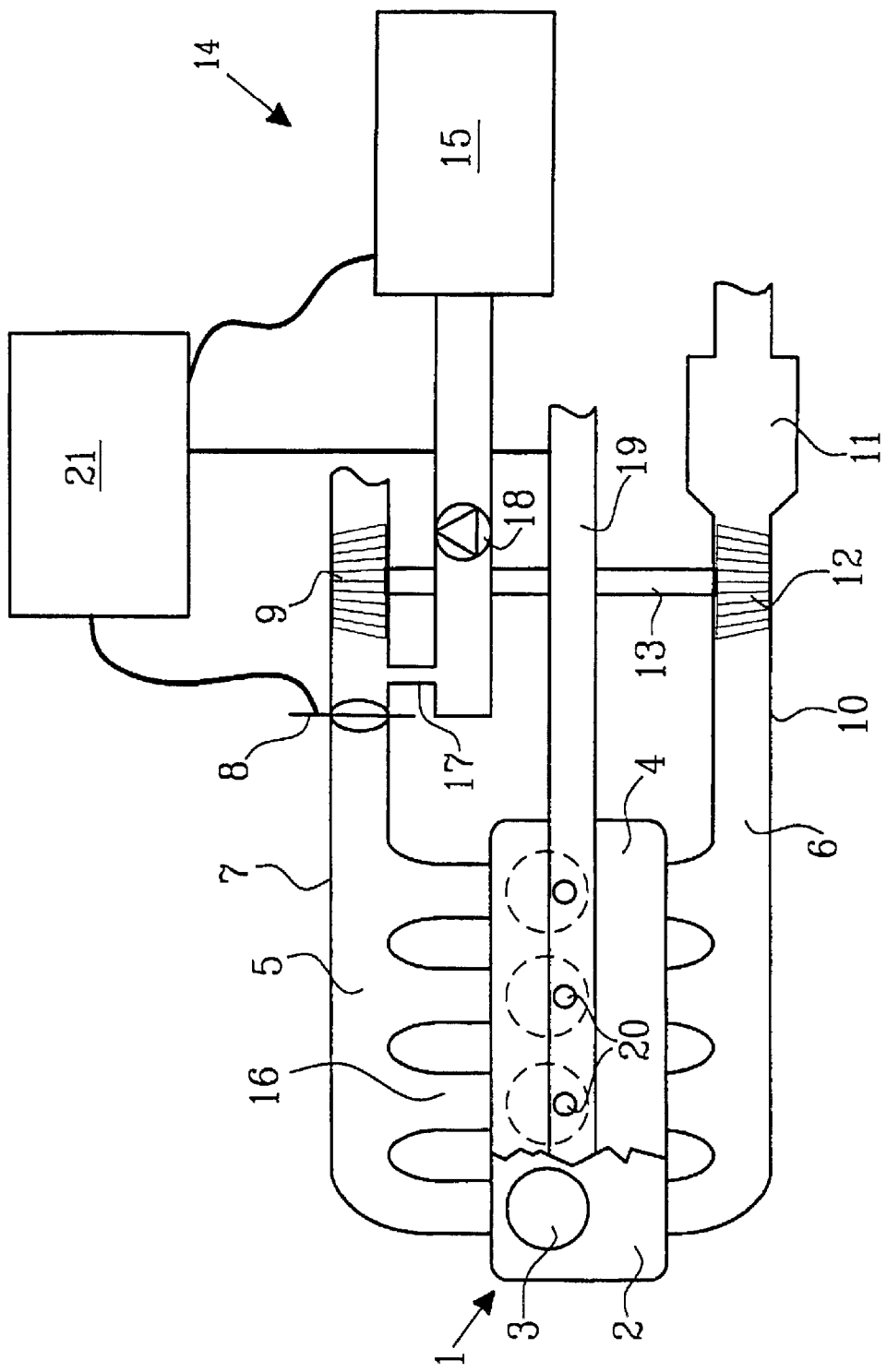
FIG. 3 schematically shows a natural gas fueled internal-combustion engine configured according to the teachings of the present invention.

A natural gas fueled internal combustion engine 1 is shown schematically in FIG. 3. The internal-combustion engine 1 itself is of the conventional type and is therefore not described in detail. In one contemplated embodiment, the internal-combustion engine 1 comprises (includes, but is not limited to) an engine block 2 in which there are a number of combustion chambers in the form of cylinders 3 and a cylinder head 4 in which inlet tracts (not shown), inlet ports (not shown), a valve assembly (not shown), exhaust pipes (not shown) and exhaust ports (not shown) are formed. These are all of conventional design and well known to those persons skilled in these arts. The cylinder head 4 is partly sectioned whereby one of the engine's cylinders 3 is shown. An intake manifold 5 is coupled to the inlet ports of the cylinder head 4 and an exhaust manifold 6 is coupled to the cylinder head's exhaust ports. The inlet manifold 5 is connected to an inlet tract 7 in which a throttle 8 is mounted. Further, a compressor 9 can be mounted in the inlet tract when the internal-combustion engine is supercharged. When the engine is supercharged, it preferably includes an inlet air cooler (not shown) mounted downstream of the compressor 9. The exhaust manifold 6 is in turn coupled to an exhaust system 10 in which a catalyzer 11 is mounted. In some cases, when the internal-combustion engine is of the turbo type, there is also an exhaust turbine 12 mounted in the exhaust system 10. The exhaust turbine 12 and the compressor 9 are usually mounted on a common rotational shaft 13, but also other types of power transmission from the turbine to the compressor are possible.

The cylinders 3 are fed fuel in the form of natural gas via a fuel injection system 14. The fuel injection system 14 includes a fuel reserve 15 in the form of a high pressure tank and fuel pipes that connect the fuel tank 15 to an injection device, exemplarily in the form of injectors 17, which are usually mounted upstream of the inlet manifold 5. A common placement of the injectors 17 is between the compressor 9 and the throttle 8. Alternately, the injectors can be mounted upstream of the compressor. In an alternative embodiment, the injection can take place outside the cylinders 3 and in proximity to the cylinders" inlet ports, that is frequently referred to as port injection. According to a further embodiment, the injectors 17 are mounted and open directly in the combustion chambers 3 in what is commonly referred to as direct injection. The fuel is pumped through the fuel injection system by a pump 18.

Furthermore, there is an ignition system 19 connected to the internal-combustion engine. The ignition system 19 is of conventional type and includes a voltage source (not shown) and a high voltage part with spark plugs 20 that are mounted in the cylinder head 4. In an alternative embodiment of the invention, ignition can take place by injection of a small quantity of diesel fuel directly into the cylinders in what is referred to as a micro pilot configuration. Thus, in this case, no spark plugs are used; rather, they are replaced by diesel injectors. The injected amount of diesel fuel gives a negligible torque increase compared to natural gas that is ignited by the injected diesel and used as the main fuel.

The internal-combustion engine is controlled by a control device 21 that is arranged to control: the throttle 8 to obtain the correct throttle angle for the current operation state of the internal-combustion engine, injection devices 17 for achieving the correct supply of fuel for the current operation state of the internal-combustion engine and an ignition system to achieve the correct ignition time for the current operation state of the internal-combustion engine. For this purpose, the control device 21 communicates with an actuator (not shown) arranged to set the throttle angle, with the injection device 17 to set the injection times and with the ignition system for ignition control.

Figure 4:
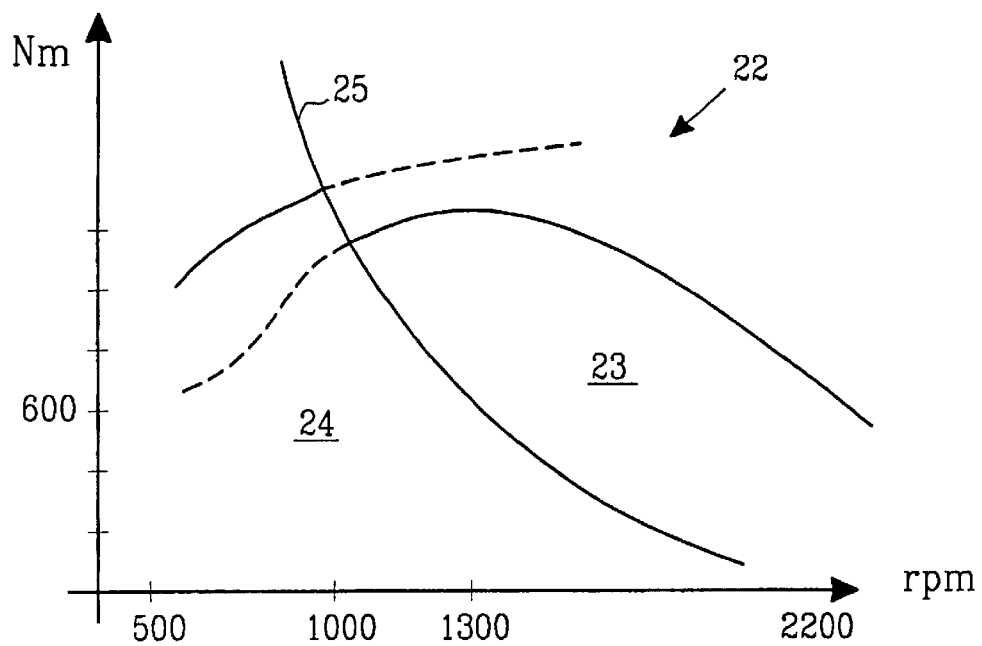
FIG. 4 graphically illustrates an example of the appearance of an operating point map for $\lambda$ value control in the internal-combustion engine's load-rotation speed diagram.

In FIG. 4, an operating point map is shown schematically for $\lambda$ value control in the internal-combustion engine load-rotation speed diagram. The load-rotation rate diagram is divided into a first area 23 where the internal-combustion engine operates in lean operation and a second area 24 where the internal-combustion engine operates in stochiometric, or rich operation with a $\lambda$ value between 0.7 and 1.0. By rich or stochiometric operation, a $\lambda$ value between 0.7 and 1.0 is meant. By lean operation, a $\lambda$ value exceeding 1.0, and preferably between 1.25 and 2.0 is meant. The invention works best in lean operation with a $\lambda$ value between 1.25 and 1.6. A $\lambda$ value in the range 1.5 1.6 can be used to achieve significantly reduced NOx formation without misfiring, high hydrocarbon emission or torque loss because of too high $\lambda$ values. For uniform and stochiometric operation, it is intended that the fuel air mixture in the internal-combustion engine combustion chamber be $\lambda = 1.0$. The first area and the second area are separated by a boundary line 25 between lean operation and stochiometric operation. The boundary line 25 is placed so that the temperature in a volume downstream of the exhaust ports of the internal-combustion engine combustion chamber is limited to a maximum allowed temperature. This maximum temperature is usually about 700°. The boundary line 25 is thus a power limit for combustion in uniform operation whereby it is ensured that the internal-combustion engine and units coupled downstream of it are not subject to excessive thermal loads. The boundary line can be determined through tests during design of a motor type by measuring the exhaust gas temperature with a sensor at chosen positions downstream of the combustion chamber exhaust ports. Combustion engines are run in stochlometric ratio at different operating points with increasing loads and rotation rates until the maximum temperature is measured. The operating points where maximum temperatures are reached are noted and the complete curve is obtained by interpolation between these measurement values. Also, theoretical calculations can be the basis for determining the operating points" temperature values and thereby the form and position of the boundary line in the internal-combustion engine's load-rotation speed diagram.

In a preferred embodiment, the boundary line 25 is designed with a certain hysteresis. This means that the first area 23 and the second area 24 partly overlap each other.

Figure 5:
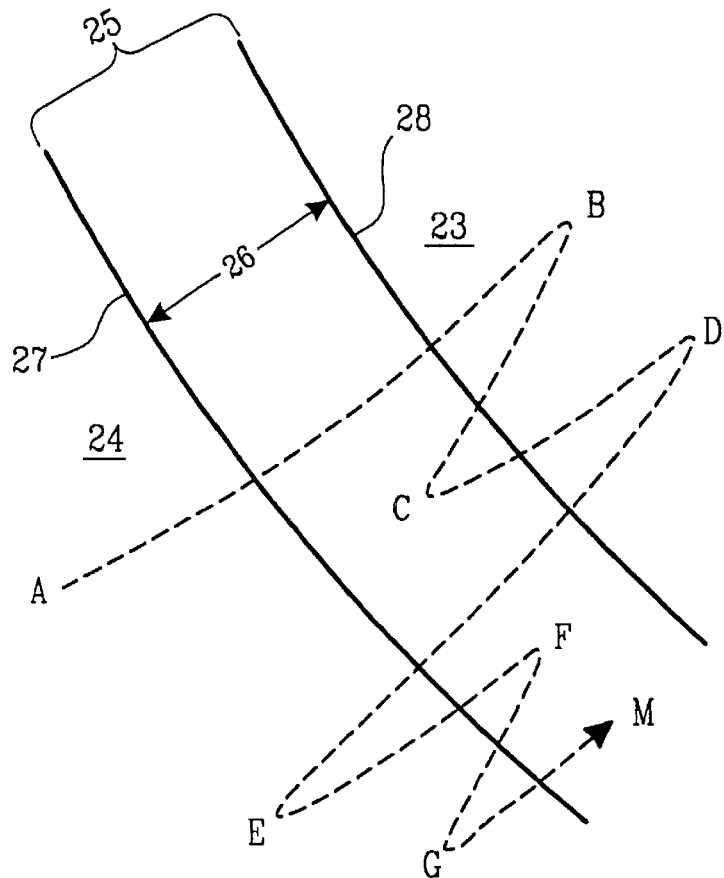
FIG. 5 schematically shows the function of overlap or hysteresis between a first area and a second area in an internal-combustion engine's load-rotation speed diagram.

In FIG. 5 the function of overlap or hysteresis between a first area 23 and a second area 24 in an internal-combustion engine load-rotation speed diagram or graph is shown schematically. The first area and the second area are separated by a boundary line or space 25 that has a certain hysteresis 26. The boundary line or space is thus formed by a first boundary line 27 and a second boundary line 28 which follow each other at a distance corresponding to the hysteresis 26. The first boundary line 27 delimits areas in the internal-combustion engine's load-rotation speed diagram where the internal-combustion engine develops low power and the second boundary line 28 delimits areas in the internal-combustion engine load-rotation speed diagram where the internal-combustion engine develops high power. An operating point variation 29 shows how the internal-combustion engine conforms to different modes of operation defined by the first area 23 and the second area 24 for transition from the second area 24 to the first area 23 and vice-versa. The operating point variation thus traverses operating points A M designated in FIG. 5. On passage from A to B, the operating point first passes the first boundary line 27. In this mode, the internal-combustion engine does not change from its operation in its second operation mode defined by the second area 24 where the internal-combustion engine operates under stochiometric combustion conditions. Somewhat later the operating point passes the second boundary line 28. In this position, the internal-combustion engine changes its operation to its first operation mode defined by the first area 23 where combustion takes place with the lean fuel-air mixture. Further, on moving from operating point B to C, the second boundary line 28 is passed. Since both boundary lines have not been traversed, there is no adjustment to the second mode of operation corresponding to the other operation area 24. When the operating point variation continues from C to D, the second boundary line 28 is passed again without altering the operation mode. In this position the internal-combustion engine already operates in its first operation mode corresponding to the first area 23. Later, when the operating point variation moves from D to E, both boundary lines 27 and 28 are passed again and the internal-combustion engine changes its operation mode from the first area 23 to the second area 24. In the same way, there is no change in operation mode when the operating point moves from E to F, from F to G and from G to M. In summary, the internal-combustion engine's operation mode changes from the first area 23 to the second area 24 when the second boundary line 28 and the first boundary line 27 are consecutively exceeded. There is a change in the internal-combustion engine's operation mode from the second area 24 to the first area 23 when the first boundary line 27 and the second boundary line 28 are consecutively passed. Use of an overlap between the first area 23 and the second area 24 means that unstable commutation between the two areas for little variation in the operating point near the boundary line 25 is avoided.

On moving from the first area 23 to the second area 24, or vice versa, there is a stepwise change in the $\lambda$ value according to a preferred embodiment of the invention. In an especially preferred embodiment this stepwise change takes place in the form of a linear ramp. By this is meant that the $\lambda$ value increases or decreases by a small increment during a prescribed time period or during a predetermined number of engine rotations. Through this procedure the risk of abrupt changes occurring in the torque developed on changing the operation area of the internal-combustion engine is reduced.

Figure 6:
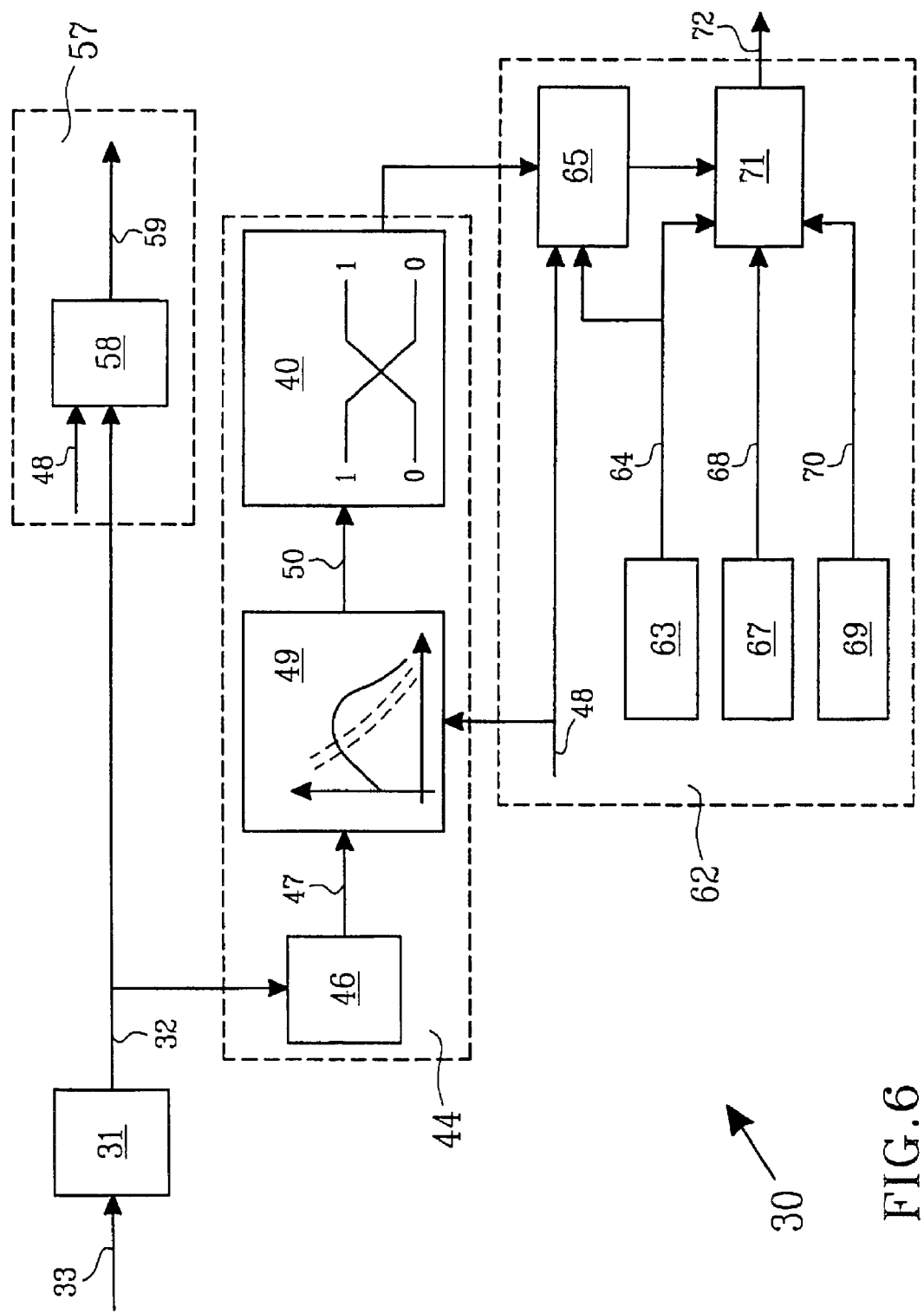
FIG. 6 schematically shows a control system for controlling the throttle angle and the supplied amount of fuel to the internal-combustion engine's combustion chamber.

In FIG. 6 an example of a control system 30 for controlling the throttle angle and the amount of fuel supplied to the internal-combustion engine combustion chamber is schematically shown. The control system includes a first functional block 31 that generates an output signal 32 according to the required torque. The input signal to the first functional block 31 includes for instance the gas pedal position for the vehicle.

The output signal 32 from the first functional block 31 is an input signal to a second functional block 44. The second functional block 44 determines an output signal 45 according to the required $\lambda$ value. The second functional block includes a first circuit 46 in which the output signal 32, according to the required developed torque, is low pass filtered whereby high frequency fluctuations are reduced and a third output signal 47 is generated and where the engine's dynamic response is taken into consideration. The low pass filtered third output signal 47 and an input signal 48 corresponding to the current engine rotation rate are used in a second circuit 49 in which an output signal 50 corresponding to the current operating point is generated. The output signal 50 is the input signal to a third circuit 40 which generates an output signal corresponding to the degree of mode change between the first operation mode and the second operation mode depending on which area the engine is in and how the change has taken place. A more detailed description of an example design of the circuit 40 is given below in connection with FIG. 7.

Using the low pass filtered third output signal and the input signal 48 corresponding to the current engine rotation rate, an operating point position for the internal-combustion engine is determined for an engine specifically specified load-rotation rate diagram according to what has been described hereinabove. In a preferred embodiment, the output signal 45 corresponding to the required $\lambda$ value is generated taking account of possible overlap between the first area 23 and the second area 24 corresponding to different operation modes of the internal-combustion engine and/or existent rampings up or down of the $\lambda$ value on changing from the one area to the other area.

Figure 7:
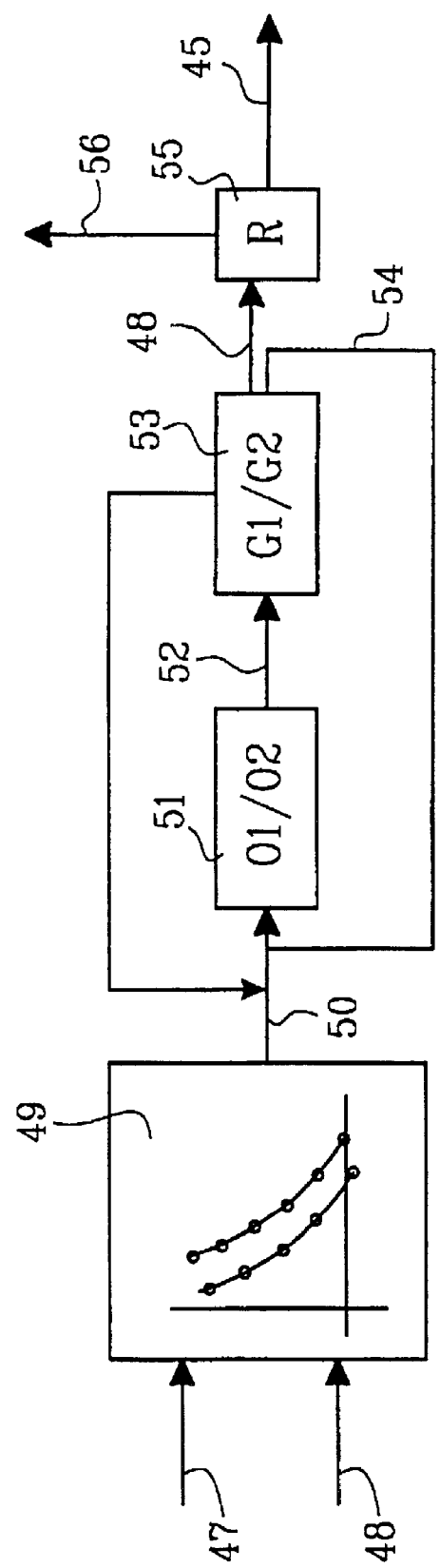
FIG. 7 schematically illustrates circuits for determining which operation mode the internal-combustion engine is in and the ramping up or down of the associated $\lambda$ value.

In FIG. 7 circuits of the second functional block 44 in which an output signal 45 corresponding to the required $\lambda$ value is determined are shown schematically. In the second circuit 49 an operating point position for the internal-combustion engine in a specified engine-specific load-rotation speed diagram is determined by the low pass filtered third output signal and the input signal 48 corresponding to the current engine rotation rate. In this case, the second circuit 49 generates an output signal 50 corresponding to the current operating point. In the third circuit 51 it is determined whether the operating point lies in the first area 23 or the second area 24 and an output signal 52 is generated that corresponds to the current area. Furthermore, a fourth circuit 53 using the output signal 52 corresponding to the current area and an output signal 50 corresponding to the current operating point determines whether the first boundary line 27 or the second boundary line 28 has been exceeded. In this case, an output signal 54 is generated indicating that the internal-combustion engine has changed operation mode from the first area 23 to the second area 24 or conversely. This output signal is returned to the third circuit 51 thus maintaining current information about operation area. The third circuit 53 also generates a second output signal 45' corresponding to the required λ value. In the case where there is no ramping function, this output signal corresponds to the output signal 45 from the second functional block corresponding to the required λ value. However, in a preferred embodiment, the output signal 48 from the fourth circuit 53 is an input signal to a fifth circuit 55 in which an output signal 45 from the second functional block 44 corresponding to the required λ value is generated with ramping up or down on changing from the first area 23 to the second area 24 or conversely. For generation of this ramping up or ramping down, the fifth circuit has a second input signal 56 that is a clock frequency or engine rotation rate for which continuous step-by-step ramping up or ramping down of the output signal 45 is allowed.

The output signal 45 from the second functional block 44 is the input signal to a third functional block 57 that is a conventional control device for adjusting the throttle angle. The third functional block 57 includes a first circuit 58 in which an output signal 59 corresponding to the required throttle angle is generated from the output signal 32 corresponding to the required developed torque, an input signal 48 corresponding to the current engine rotation rate and the output signal 45 corresponding to the required λ value. The output signal from the third functional block is then sent to actuators that adjust the throttle angle to the desired mode.

The output signal 45 from the second functional block 44 is also the input signal to a fourth functional block 62 which is a conventional control device for controlling the ratio between fuel and air with respect to a target value. The fourth functional block 62 includes a first circuit 63 in which an output signal 64 corresponding to a measured air flow is generated. This output signal 64 is used as the input signal to a second circuit 65 in which an output signal 66 corresponding to the target value for lambda is generated from the input signal 45 corresponding to the required lambda, the current engine rotation rate 48 and the output signal 64 corresponding to the measured air flow. A third circuit 67 comprising a λ controller generates an input signal 68 corresponding to a calculated fuel/air quotient. Further, in a fourth circuit 69, an output signal 70 is generated from a lambda sensor. In a fifth circuit 71 an output signal 72 is generated corresponding to the required amount of fuel from the output signal 66 corresponding to the target value for lambda, the output signal 64 corresponding to a measured air flow, the input signal 68 corresponding to a calculated fuel/air ratio in the other functional block and the output signal 70 from a lambda sensor, whereby adjustment of the injection time for the injectors 17 in the internal-combustion engine makes use of the input signal 72.

The invention is not limited to the above described embodiments but can be varied within the scope of the following claims. In particular the first, third and fourth function blocks can be designed in other ways readily appreciated by persons skilled in the art in view of the disclosed invention(s).

What is claimed is:

1. An apparatus for controlling the ratio of the amount of fuel and the amount of air in a natural gas fueled internal-combustion engine intended to work in a specified engine-specific load-rotation speed diagram, said apparatus comprising:
   a throttle (8) for controlling the amount of air supplied to combustion chambers in the internal-combustion engine;
   injection devices for controlling the amount of natural gas supplied to the combustion chambers;
   control devices (21) for controlling the throttle and the injection devices, whereby the control device (21) is arranged to control the ratio of the amount of fuel and the amount of air dependent on the current operating point in the internal-combustion engine load-rotation speed diagram wherein the load-rotation speed diagram is divided into a first area where the internal-combustion engine operates in lean mode and a second area where the internal-combustion engine operates in stochiometric or rich mode and by that the area for stochiometric operation is arranged to be used for operating points in the load-rotation speed area with low power.

2. The apparatus as recited in claim 1, wherein the stochiometric operation area is separated from the lean operation area so that the temperature at a position downstream of the combustion chamber exhaust ports of the internal-combustion engine is limited to a maximum allowed temperature at which the control device (21) is arranged to allow change from stochiometric or rich operation to lean operation before the maximum temperature is reached.

3. The apparatus as recited in claim 1, wherein the control device (21) is arranged to determine the current operating point in the load-rotation speed diagram using a control signal corresponding to the required developed torque from the internal-combustion engine.

4. The apparatus as recited in claim 1, wherein the control device (21) is arranged to control the change between lean operation and stochiometric or rich operation on passage from the first area to the second area by step by step adjustment of the ratio of the amount of fuel and the amount of air.

5. The apparatus as recited in claim 1, wherein the control device (21) is arranged to control the change between stochiometric or rich operation and lean operation on passage from the second area to the first area by step by step adjustment of the ratio of the amount of fuel and the amount of air.

6. The apparatus as recited in claim 1, wherein the first area and the second area partly overlap each other thereby hindering unstable commutation between the areas.

7. The apparatus as recited in claim 1, wherein the first area corresponds to a λ value between 1.25 and 1.6 and that the second area corresponds to a λ value between 0.7 and 1.0.

8. A method for controlling the ratio of the amount of fuel and the amount of air in a natural gas fueled internal-combustion engine intended to work in a specified engine-specific load-rotation speed diagram, said method comprising:

utilizing a control device (21) and controlling the internal-combustion engine so that the ratio of the amount of fuel to the amount of air is dependent on the current operating point in the internal-combustion engine load-rotation speed diagram by adjusting the throttle angle of a throttle (8) in the internal-combustion engine for controlling the amount of air supplied to the combustion chambers in the internal-combustion engine and controlling the amount of natural gas supplied to the combustion chambers via injection devices; and operating the internal-combustion engine in stochiometric or rich mode at operation points in the load-rotation rate diagram with low power and in lean mode at operation points in the load-rotation speed diagram with high power.

9. The method as recited in claim 8, wherein the area of stochiometric or rich operation is separated from the area of lean operation so that the temperature at a position downstream of the combustion chamber exhaust ports of the internal-combustion engine is limited to a maximum allowed temperature at which the control device (21) is arranged to allow change from stochiometric or rich operation to lean operation before the maximum temperature is reached.

10. The method as recited in claim 8, wherein the control device (21) is utilized to determine the current operating point in the load-rotation speed diagram using a control signal corresponding to the required torque from the internal-combustion engine.

11. The method as recited in claim 8, wherein the control device (21) controls the change between lean operation and stochiometric operation on passage from the first area to the second area through step by step adjustment of the ratio of the amount of fuel and the amount of air.

12. The method as recited in claim 11, wherein the control device (21) controls the change between stochiometric operation and lean operation on passage from the second area to the first area through step by step adjustment of the ratio of the amount of fuel and the amount of air.

13. The method as recited in claim 8, wherein the first area and the second area partly overlap each other thereby hindering unstable commutation between the areas.

14. The method as recited in claim 8, wherein the first area corresponds to a λ value between 1.25 and 1.6 and that the second area corresponds to a λ value between 0.7 and 1.0.

* * * * *